(12) United States Patent
Watson et al.

(10) Patent No.: US 7,057,682 B2
(45) Date of Patent: *Jun. 6, 2006

(54) LIQUID CRYSTAL DISPLAY WITH NEUTRAL DARK STATE

(75) Inventors: Philip E. Watson, St. Paul, MN (US); Philip J. Ralli, Sudbury, MA (US); John J. Cael, Upton, MA (US)

(73) Assignee: 3M Innovative Properties Co., St. Paul, MN (US)

( * ) Notice: Subject to any disclaimer, the term of this patent is extended or adjusted under 35 U.S.C. 154(b) by 13 days.

This patent is subject to a terminal disclaimer.

(21) Appl. No.: 10/746,962

(22) Filed: Dec. 24, 2003

(65) Prior Publication Data

US 2005/0140895 A1   Jun. 30, 2005

(51) Int. Cl.
*G02F 1/1335* (2006.01)
*G02F 1/1343* (2006.01)

(52) U.S. Cl. .............................. 349/96; 349/141
(58) Field of Classification Search .......... 349/96–103, 349/141, 143
See application file for complete search history.

(56) References Cited

U.S. PATENT DOCUMENTS

| | | | |
|---|---|---|---|
| 2,445,555 | A | 7/1948 | Bennett et al. |
| 5,666,223 | A | 9/1997 | Binda |
| 6,549,335 | B1 | 4/2003 | Trapani et al. |
| 6,630,970 | B1 * | 10/2003 | Trapani et al. ............... 349/96 |
| 2002/0149726 | A1 | 10/2002 | Yano et al. |
| 2003/0001987 | A1 | 1/2003 | Trapani et al. |
| 2003/0002154 | A1 | 1/2003 | Trapani et al. |
| 2003/0122991 | A1 | 7/2003 | Itakura et al. |
| 2003/0192638 | A1 | 10/2003 | Yang et al. |
| 2003/0210370 | A1 | 11/2003 | Yano et al. |

FOREIGN PATENT DOCUMENTS

| JP | 2001-318233 | 11/2001 |
|---|---|---|
| JP | 2003-294944 | 10/2003 |

OTHER PUBLICATIONS

Delpico, Joseph; Plastics In Flat Panel Displays; XP-001094690; Polaroid Corporation, Cambridge MA.

"In-Plane Switching", Meko Ltd., Surrey, United Kingdom, [Oct. 27, 2003], <www.meko.co.uk/ipswitch.shtml>, pp. 1-3.

* cited by examiner

*Primary Examiner*—Dung T. Nguyen
(74) *Attorney, Agent, or Firm*—William D. Miller

(57) ABSTRACT

A polarizer is used with a liquid crystal display (LCD) cell whose liquid crystal molecules are switched in the plane of the cell. The LCD has birefringent properties that are different from other types of LCD cell and, unlike other types of LCD, the image contrast is maintained and there is little color shift in the dark state when a low birefringence polarizer is used with the SIP LCD cell. In one embodiment, the x-z retardation of the layers between the polarization-sensitive absorbing layer and the LCD is less than 20 nm. In another embodiment, the x-z birefringence is less than 0.0005. The low levels of retardation and birefringence may be achieved by omitting the commonly used cellulose triacetate layer between the polarization-sensitive absorbing layer and the LCD.

22 Claims, 5 Drawing Sheets

LIQUID CRYSTAL DISPLAY WITH NEUTRAL DARK STATE

FIELD OF THE INVENTION

The invention relates to optical displays, and more particularly to an improved type of liquid crystal display used with a polarizer.

BACKGROUND

Liquid crystal displays (LCDs) are optical displays used in devices such as laptop computers, hand-held calculators and digital watches. A typical LCD includes an LCD layer and an electrode matrix, disposed between a pair of absorbing polarizers. For color displays, the LCD typically also includes a color filter. The optical state of portions of the LCD cell is altered by the application of an electric field using the electrode matrix. The combination of the altered optical state of the liquid crystals and the polarizers results in the appearance of pixels of polarized light on the liquid crystal display to form the desired image.

A typical liquid crystal display includes a front polarizer, closer to the viewer, and a rear polarizer, on the other side of the LCD from the viewer. These polarizers are plane polarizers that absorb light of one polarization orientation more strongly than light of the orthogonal polarization orientation. The transmission axis of the front polarizer is usually crossed with respect to the transmission axis of the rear polarizer in a liquid crystal display.

Much commercial attention has been directed to the development and improvement of flat panel displays, particularly thin, compact flat panel displays. A problem encountered in the construction of plastic flat panel displays is the development of "black spots," which arise from the formation of bubbles in the liquid crystal material from gas that has permeated through the plastic display materials. Another problem associated with plastic flat panel displays is moisture contamination of the liquid crystal display cell. These problems are avoided in conventional liquid crystal displays by using low permeability glass substrates instead of plastic. With respect to plastic flat panel displays, these problems are addressed by adding additional gas and moisture barrier layers to the liquid crystal display structure and/or the plastic substrates. However, adding such gas and moisture barrier layers increases the thickness, weight and cost of the displays.

Polarizers in the form of synthetic polarizing films exhibit comparative ease of manufacture and handling. In general, absorption polarizing films preferentially absorb light having its electric vector directed along one direction, referred to as the absorption polarization state, and transmit light polarized orthogonal to the absorption polarization state, referred to as the transmission polarization state. This property is referred to as dichroism.

Absorption polarizers include H-type (iodine) polarizers and dyestuff polarizers. An H-type polarizer, for example, is a synthetic dichroic sheet polarizer including a polyvinyl alcohol-iodine complex. Such a chemical complex is referred to as a chromophore. The base material of an H-type polarizer is a water-soluble, high molecular weight substance, and the resulting film has relatively low moisture and heat resistance and tends to curl, peel or otherwise warp when exposed to ambient atmospheric conditions. In addition, H-type polarizers are inherently unstable, and require protective cladding, layers of cellulose triacetate (TAC), on both sides of the polarizer to prevent degradation of the polarizer in a normal working environment. H-type polarizers are commonly used in liquid crystal displays.

SUMMARY OF THE INVENTION

The requirement for H-type polarizers to include protective cladding layers adds thickness to a liquid crystal display. In some situations, the cladding layers also display an undesirable type of birefringence that results in the dark state of the display becoming colored, and also results in a reduction of the useful viewing angle of the display. There is a need, therefore, to improve the type of polarizer used with certain LCD displays, so as to reduce the thickness, to make the color of the dark state more neutral, and to maintain the large viewing angle of the display.

The present invention is directed to the use of a polarizer with a liquid crystal display (LCD) cell whose liquid crystal molecules are switched in the plane of the cell (switched-in-plane: SIP). The SIP LCD has birefringent properties tat are different from other types of LCD cell. Consequently, the use of an absorbing polarizer that introduces birefringence with a SIP LCD reduces the image contrast and introduces an undesirable color shift. The use of a low birefringence polarizer with the SIP LCD cell maintains image contrast and does not introduce a color shift.

In one embodiment, the present invention is directed to a liquid crystal display that comprises a switched-in-plane (SIP) liquid crystal display (LCD) cell. A first absorbing polarizer is disposed on a first side of the LCD cell. The first absorbing polarizer includes a layer of polarization-sensitive absorbing material, and material layers between the layer of polarization-sensitive absorbing material and the LCD cell are free of cellulose triacetate (TAC).

Another embodiment of the invention is directed to a liquid crystal display that comprises a switched-in-plane (SIP) liquid crystal display (LCD) cell and a first absorbing polarizer disposed on a first side of the LCD cell. The first absorbing polarizer has one or more layers including at least an absorbing polarizing layer. The first absorbing polarizer and the LCD cell each lie parallel to an x-y plane defined by orthogonal x- and y-axes. An z-axis is orthogonal to both the x-axis and the y-axis. The first absorbing polarizer defines a transmission polarization direction for light transmitted through the first absorbing polarizer. The transmission polarization direction is parallel to the x-axis. An x-z retardation coefficient, $b_{xz\ total}$, is defined for the first absorbing polarizer as $$b_{xz\ total} = \Sigma(n_{xi} - n_{zi})1_i,$$

where $n_{xi}$ is the refractive index for light polarized parallel to the x-axis in the ith layer of the first absorbing polarizer, $n_{zi}$ is the refractive index for light polarized parallel to the z-axis in the ith layer of the first absorbing polarizer and $1_i$ is the thickness of the ith layer of the first absorbing polarizer in the z-direction, and where i is an integer identifying different layers of the first absorbing polarizer. The absolute value of $b_{xz\ total} = \Sigma(n_{xi} - n_{zi})\ 1_i$ is less than 20 nm.

Another embodiment of the invention is directed to a liquid crystal display that comprises a switched-in-plane (SIP) liquid crystal display (LCD) cell; and a first absorbing polarizer disposed on a first side of the LCD cell. The first absorbing polarizer has an absorbing polarizing layer. The first absorbing polarizer and the LCD cell each lie parallel to an x-y plane defined by orthogonal x- and y-axes, a z-axis being orthogonal to both the x-axis and the y-axis. The first absorbing polarizer defines a transmission polarization direction for light transmitted through the first absorbing polarizer. The transmission polarization direction is parallel to the x-axis. The refractive index for light polarized parallel to the x-axis in the absorbing polarizing layer is $n_x$ and the refractive index for light polarized parallel to the z-axis in the absorbing polarizing layer is $n_z$. An absolute value of $\Delta n_z = n_x - n_z$ is less than 0.0005.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description-of various embodiments of the invention in connection with the accompanying drawings, in which.

Figure 1:
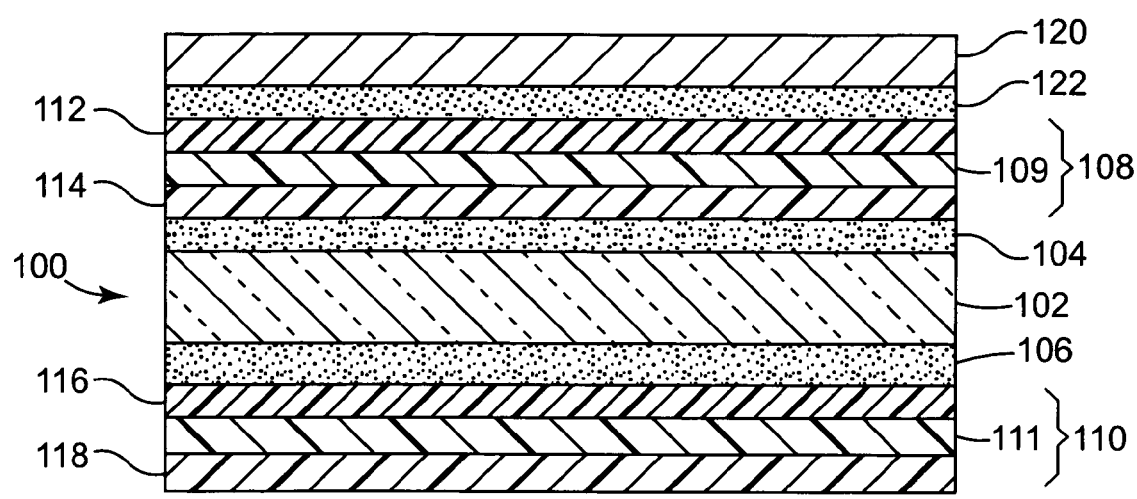
FIG. 1 schematically illustrates a prior art liquid crystal display (LCD) that uses H-type absorption polarizers.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to liquid crystal displays (LCDs), and is particularly applicable to LCDs whose liquid crystals are switched in the plane of the display. The use of an absorbing polarizer that has reduced birefringence yields improved viewing angle and maintains color neutrality in the dark state compared to an LCD that uses absorbing polarizers that have TAC layers.

A conventional liquid crystal display (LCD) stack 100 that uses H-type polarizers is schematically shown in FIG. 1. A liquid crystal display cell 102 is typically formed of a liquid crystal (LC) layer sandwiched between two glass plates. The upper and lower surfaces of the LCD cell 102 are provided with layers 104, 106 of an adhesive, e.g., a pressure sensitive adhesive, to secure polarizer structures 108 and 110 to each surface of the liquid crystal display cell. The H-type polarizers 108 and 110 each include iodine-containing absorbing polarizer layers 109, 111, and also include layers 112, 114, 116, 118 of cellulose triacetate (TAC) as a protective cladding coated or laminated on both surfaces of the absorbing polarizer layers 109 and 111. The liquid crystal display stack 100 may also include a transflector or reflector 120 for enhancing the brightness and contrast of the liquid crystal display. The transflector or reflector 120 may be attached to the back side of the display by an adhesive layer 122, e.g., a pressure sensitive adhesive, the transflector or reflector functioning to enhance the brightness and contrast of the liquid crystal display. The absorbing polarizer layers 109 and 111 each typically have a thickness of approximately 20 microns, while each of the TAC layers 112, 114, 116, 118 is typically approximately 80 microns thick, and the pressure sensitive adhesive layer 122 typically has a thickness of approximately 25 microns.

The current trend in LCD display cells, for larger display panels for application in, for example, LCD-TVs and in desktop monitors, introduces a requirement for increased viewing angle. This has led to the adoption of LCDs that are different from the standard twisted nematic (TN) or super twisted nematic (STN) LCD cell. One class of LCDs is referred to herein as switched-in-plane (SIP) LCDs. An SIP LCD cell is different from other types of LCD cell in a number of important ways, as is now described with reference to FIG. 2. A SIP LCD cell 200 is formed with a layer of liquid crystal (LC) molecules 202 disposed between two covers 204 and 206, typically glass plates. Absorbing polarizers 205 are typically mounted to the outside of the glass plates 204 and 206. Electrodes 208 are mounted on one of the glass plates 204. The electrodes 208 lie in the same plane as each other, unlike the electrodes of, e.g. a TN or STN display, in which complementary electrodes are mounted on the two different glass plates.

A column 210 of LC molecules is shown for the unswitched state, with no voltage between electrodes 208a and 208b. The molecules 210 are oriented with their long axes parallel to the glass plates 204 and 206, but in a direction out of the plane of the figure. This orientation of the LC molecules arises because at least one of the plates 204 and 206 passively aligns the molecules in this direction, for example through the use of an alignment layer interior to the cell 200.

When a voltage is applied across a pair of electrodes, for example electrodes 208c and 208d, an electric field arises between the electrodes: the electric field lines 214 are schematically provided to show the direction of the electric field between the electrodes 208c and 208d. The long axes of the LC molecules orient to the direction of the electric field lines 214, in a direction parallel to the plane of the glass plates, and parallel to the plane of the figure, as is shown for the column 212 of LC molecules. Unlike TN LCDs, the LC molecules in the SIP LCD are not anchored to the lower plate 204, and so are free to rotate through 90° when a voltage is applied across an electrode pair. The LC molecules align themselves to the applied electric field while remaining parallel to the glass plates 204 and 206.

This behavior is different from that of, e.g. a TN LCD, in which one end of the LC molecule chain is anchored to one of the glass plates and the other LC molecules attempt to align themselves to the electric field applied between the glass plates, at right angles to the glass plates. The resulting orientation of the LC molecules at different positions through the TN LCD causes the optical characteristics of the TN LCD to vary with viewing angle. In the SIP LCD, on the other hand, with the LC molecules lying parallel to the plane of the glass plates, there is little variation in the orientation of the LC molecules with varying depth through the SIP LCD. Consequently, the optical characteristics of the SIP LCD are substantially constant over a far greater range of viewing angles than with a TN LCD display. The viewing angle of an SIP LCD may be as high as 160°, or more, in all directions.

Figure 2:
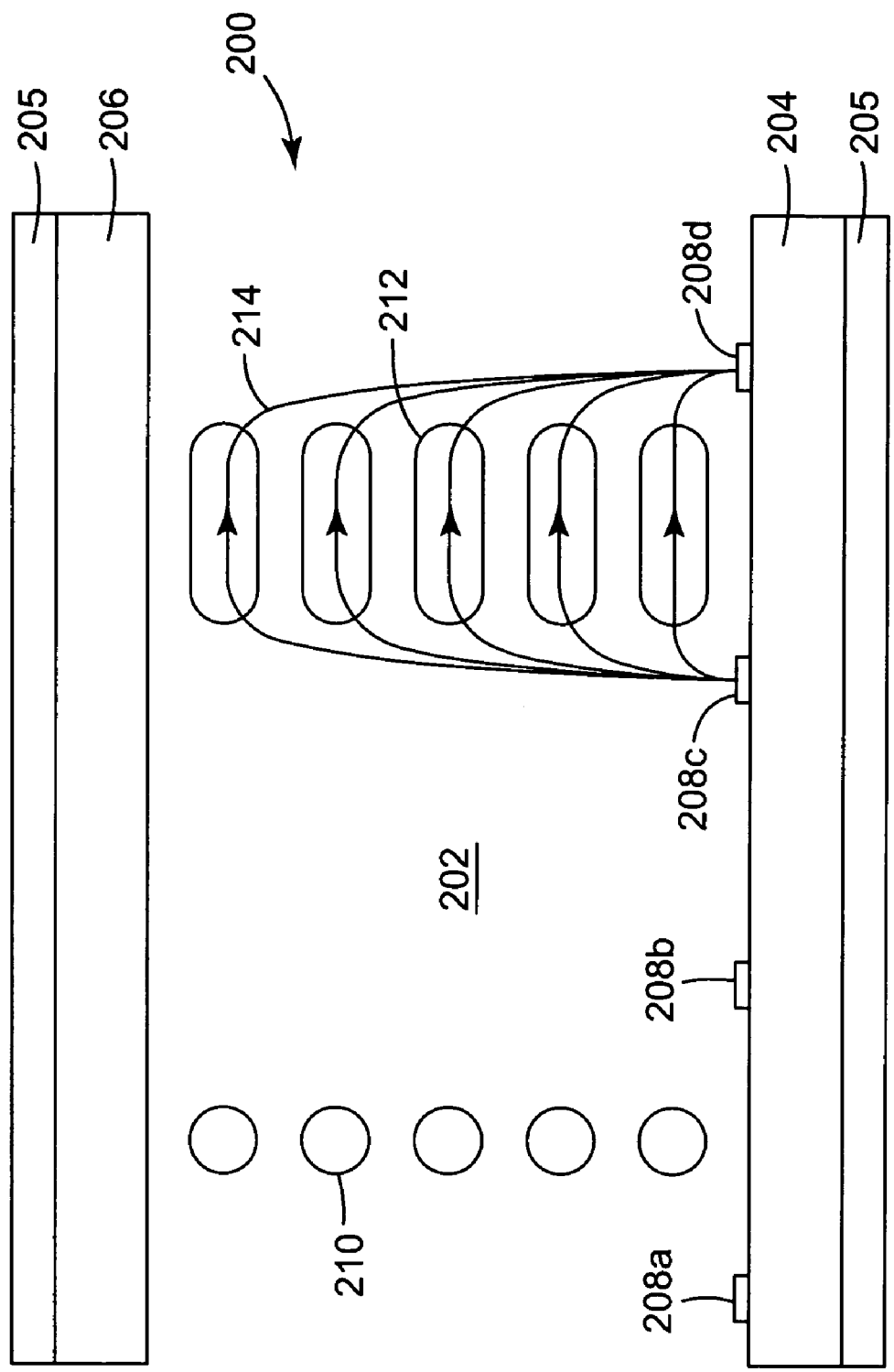
FIG. 2 schematically illustrates a switched-in-plane (SIP) LCD.

The term switched-in-planar (SIP) LCD as described above is intended to cover a variety of LCDs known by more commonly used terms such as, but not limited to, in-plane switched (IPS) LCDs, super IPS LCDs, fringe field switching (FFS) LCDs, FFS-ultra LCDs, ferroelectric LCDs and antiferroelectric LCDs, that operate under principles like those described with reference to FIG. 2.

Some polarizers are based on the interaction of light with the inherent chemical structure of the base material used to form the polarizer sheet itself. These are referred to as intrinsic polarizers. This behavior contrasts with that of H-type polarizers, and other absorbing polarizers such as dyestuff polarizers, that require the use of dichroic additives to the matrix of the polarizer sheet. Intrinsic polarizers are also typically thin and durable.

One type of intrinsic polarizer is the K-type polarizer, which typically includes a synthetic dichroic plane polarizer based on molecularly oriented polyvinyl alcohol (PVA) sheets or films with a balanced concentration of light-absorbing chromophores. A K-type polarizer derives its dichroism from the light absorbing properties of its matrix, not from the light-absorbing properties of dye additives, stains, or suspended crystalline materials. Thus, a K-type polarizer may have both good polarizing efficiency and good heat and moisture resistance. A K-type polarizer may also be very neutral with respect to color.

An improved K-type polarizer, referred to as a KE polarizer, is manufactured by 3M Company, Norwood, Mass. The KE polarizer has improved polarizer stability under severe environmental conditions, such as high temperatures and high humidity. In contrast to H-type polarizers, in which the light absorption properties are due to the formation of a chromophore between PVA and a tri-iodide ion, KE polarizers are made by chemically reacting the PVA by an acid catalyzed, thermal dehydration reaction. The resulting chromophore comprises polyvinylene, and the resulting polymer may be referred to as a block copolymer of vinylalcohol and vinylene.

Unlike H-type polarizers, K-type polarizers such as KE polarizers do not need to be sandwiched between sheets of TAC. The polyvinylene chromophore of the KE polarizer is an extremely stable chemical entity, since the chromophore is intrinsic to the polymer molecule. This chromophore is thermally stable as well as resistant to attack from a wide range of solvents and chemicals.

A K-type polarizer such as a KE polarizer has several additional advantages over H-type polarizers. K-type polarizers are thinner, and may be designed with variable transmission levels. Most notably, K-type polarizers such as KE polarizers may be used in applications that require high performance under severe environmental conditions, including high temperatures and high humidity, such as 85° C. and 85% relative humidity, for extended periods of time. Under such extreme environmental conditions, the stability of H-type polarizers is greatly reduced, thus limiting their usefulness in flat panel displays that are used under harsh environmental conditions.

Due to the inherent chemical stability of K-type polarizers, a wide variety of adhesive formulations, including pressure sensitive adhesives, can be applied directly to K-type polarizers. Furthermore, a single-sided plastic support is adequate to give physical support for K-type polarizers, and since this support can be located outside the optical path of the liquid crystal display module, it need not be optically isotropic and lower-cost substrates such as polyethylene terephthalate (PET) are acceptable alternatives. Moreover, the ability to construct single-sided laminates allows the optical structures to be thinner, allowing for additional flexibility in the design and manufacture of flat panel display elements. In addition, the TAC cladding layers typically used with H-type polarizers introduce birefringence. K-type polarizers, on the other hand, do not require the use of TAC layers, and so do not introduce birefringence to a display system.

Figure 3:
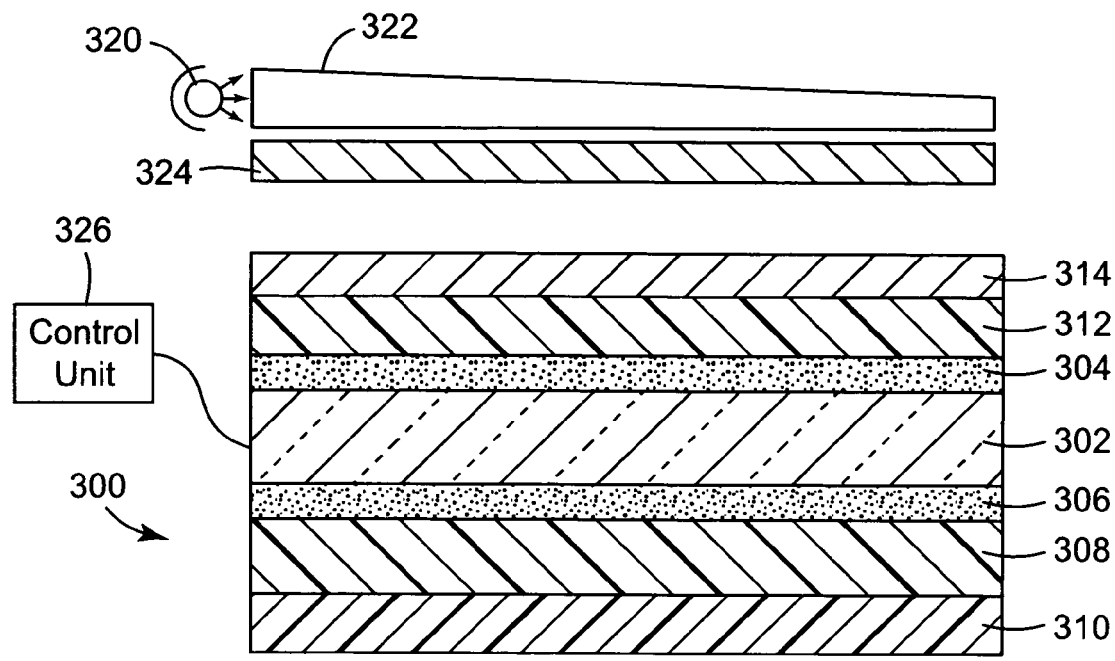
FIG. 3 schematically illustrates an embodiment of a SIP LCD that uses intrinsic polarizers in accordance with principles of the present invention.

FIG. 3 shows one particular embodiment of an LCD unit 300 according to principles of the present invention. A SIP LCD cell 302, comprising a LC layer 302a disposed between two cover layers 302b, may be coated with layers 304 and 306 of an adhesive, e.g., a pressure sensitive adhesive such as Polatechno AD-20, to secure polarizer structures to the liquid crystal display cell 302. An absorbing polarizer 308, for example, an intrinsic polarizer such as K-type or KE polarizer sheet, is disposed on the viewing side of the LCD stack 300. The absorbing polarizer 308 may be attached to the LCD cell 302 via the adhesive layer 306. The absorbing polarizer 308 does not contain TAC layers. A K-type polarizer sheet typically has a thickness of approximately 20 microns. It is important to reduce the birefringence of the material layers between the layer of polarizing-sensitive absorbing material and the LCD, such as the adhesive layer 304. There may, however, be a TAC layer on the outside of the polarizer 308, since retardation introduced outside the space between the layer of polarization-sensitive absorbing material and the LCD cover layer 302b is less important than the retardation introduced inside this space.

Other types of absorbing polarizers may also be used in addition to K-type polarizers. For example, the absorbing polarizer may be an H-type polarizer without a TAC layer between the layer of polarization-sensitive absorbing polarizer layer and the LCD cover layer. The absorbing polarizer may also be a coated polarizer, for example a coated LC polarizer layer such as is manufactured under product label TCF™ by Optiva Inc., South San Francisco, Calif. Other types of absorbing polarizers that may be used include shearing polarizers and dye polarizers.

The polarizer 308 may also include a supporting substrate in the form of a polyethylene terephthalate (PET) support layer 310 facing the viewing side of the LCD unit 300. The PET support layer 310 typically has a thickness of approximately 25–180 microns, and may be used as the outer cover for the display. The unit 300, however, does not require a supporting substrate such as PET support layer 310. For example, a KE polarizer sheet may itself be attached to a display.

A second absorbing polarizer 312, for example an intrinsic polarizer such as a K-type or KE polarizer sheet, or one of the other types of polarizer discussed above, is disposed on the other side of the LCD cell 302. The second absorbing polarizer 312 may also be free of TAC layers, at least between the layer of polarization-sensitive absorbing material and the LCD cell 302, and may be attached to the LCD cell 302 using adhesive layer 304. The intrinsic polarizer 312 also typically has a thickness of approximately 20 microns. A transflector or reflector 314 may be disposed to the back side of the intrinsic polarizer 312 to enhance the brightness and contrast of the liquid crystal display.

A light source 320 may be used to provide light for the display unit 300 when used in a backlit mode. Light from the light source 320 may be directed to the SIP LCD cell 302 via a light guide 322. Light exiting the side of the light guide 322 may pass through one or more optional light management layers 324 before incidence on the transflector layer 314. Examples of light management layers include brightness enhancing layers, such as BEF® and DBEF® films available from 3M Company, St. Paul, Minn. A controller 326 may be connected to the LCD cell 302 to control the images imposed on the light passing through the LCD cell 302.

The use of intrinsic polarizers in the liquid crystal display stack eliminates the need for protective cladding of the polarizers. The cladding used for other types of polarizers, e.g., H-type polarizers, includes a layer of TAC disposed on each side of the polarizer.

Avoiding the use of TAC cladding layers results in a significant reduction in the thickness of the liquid crystal display stack. For example, the LCD unit 300 illustrated in FIG. 3, including the PET support layer 310 and transflector or reflector 314, may be approximately 300 microns thinner than the corresponding liquid crystal display stack 100 of FIG. 1 that uses TAC layers.

Figure 4:
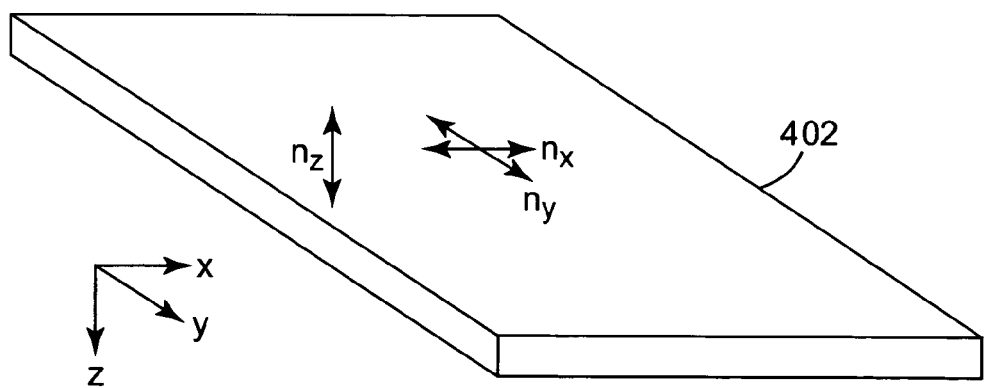
FIG. 4 schematically illustrates birefringence in a material layer.

Other important advantages arise when using a polarizer, such as a KE polarizer, with a SIP LCD. These advantages arise in the viewing angle and color shift of the image light. This is now explained with reference to FIG. 4, which shows a layer of material 402. The layer 402 lies parallel to the x-y plane. The thickness of the layer 402 is defined as the dimension in the z-plane. The refractive indices for light with electric vectors parallel to the x, y and z planes are defined as $n_x$, $n_y$, and $n_z$ respectively. The material is isotropic where $n_x=n_y=n_z$. In other words, light propagating through the material layer experiences the same refractive index, irrespective of the polarization state of the light and the angle of incidence. The absolute values of the refractive index need not be exactly the same to be isotropic, and there may be some small difference between the refractive indices.

A retardation coefficient, b, is defined as the being the product of the layer thickness times the difference between two of the refractive indices. For example, if there is a difference, $\Delta n_{xz}$, between the refractive indices $n_x$ and $n_z$, then the x-z retardation coefficient, $b_{xz}$, is given as:

$$b_{xz}=(n_x-n_z)\mathrm{l}=\Delta n_{xz}\mathrm{l} \qquad (1)$$

where $\Delta n_{xz}$ is the x-z birefringence and l is the thickness of the layer 402.

TAC is birefringent and, if made of TAC, the layer 402 operates as a negative C-plate. In other words, the refractive index for light polarized parallel to the x-axis is $n_x$ and the refractive index for light polarized parallel to the y-axis is $n_y$, where $n_x=n_y$. Light polarized parallel to the z-axis, however, experiences the refractive index $n_z \neq n_x, n_y$. Therefore, the TAC layer 402 is seen as being isotropic only for light that is normally incident on the film 402. For light that is not normally incident on the TAC layer 402, there is a component of the light that experiences the refractive index $n_z$. Therefore, the TAC layer 402 is birefringent for light that is not normally incident on the TAC layer 402, and introduces retardation into the non-normal light. The x-z birefringence for one specific sample of TAC is given by $\Delta n_{xz}=n_x-n_z=1.4923-1.4915=0.0008$.

The values of birefringence may be either negative or positive, depending on the relative magnitudes of $n_x$ and $n_z$. Values of retardation and birefringence described herein are defined as absolute values of magnitude, regardless of whether they are positive or negative. Thus a birefringence value provided as 0.0008 describes both $n_x-n_z=0.0008$ and $n_z-n_x=0.0008$.

The TAC layer on one side of an absorbing polarizer may be around 50 μm thick, and so the retardation coefficient of the TAC layer, calculated using expression (1) above, is 40 nm. For some LCD cells, such a high x-z birefringence is useful for compensating off-axis residual birefringence in the LCD cell itself. For a SIP LCD cell, however, there is negligible off-axis residual birefringence, since the LC molecules are contained in the plane of the LC layer, parallel to the x-y plane. Accordingly, the x-z birefringence of a TAC layer serves to reduce the contrast of the SIP LCD cell, because the TAC layer mixes the polarization state of the light passing through the TAC layer, rather than increasing the contrast.

It is preferable, therefore, when using a SIP LCD cell to have a smaller x-z retardation coefficient than is normally experienced with an H-type polarizer having TAC layers, so as to maintain contrast of the image. This is true particularly at large viewing angles. The reduced retardation coefficient may be achieved by reducing the thickness of the absorbing polarizing layer and the thickness of any birefringent material between the absorbing polarizer and the LC layer. Thus, the TAC layers may be reduced in thickness in order to reduce the x-z retardation coefficient.

Also, the x-z birefringence may be reduced. The value of $n_y$, the refractive index for light in the polarization state that is absorbed in the polarizer, is less important than $n_x$ and $n_z$, since most of the y-polarized light is absorbed. The value of $n_y$, therefore, may be the same as $n_x$ and $n_z$, but this is not a requirement and may be different from $n_x$ and $n_z$. In one particular example of a KE polarizer, $n_x=1.5078$ and $n_z=1.5075$, and so $\Delta n_{xz}=0.0003$. The x-z birefringence of the polarizer may, therefore, be less than 0.0005.

The x-z retardation coefficient may be reduced by reducing both the thickness of the birefringent layers and the x-z birefringence. For example, the thickness of a KE polarizer is typically about 20 μm, and so the x-z retardation coefficient of a KE polarizer, calculated from expression (1) above, is 6 nm. Thus, the value of the birefringent coefficient for a typical KE polarizer is more than an order of magnitude less than the retardation coefficient for a typical TAC layer. A thinner KE polarizer layer, about 15 μm has an x-z retardation coefficient of about 4.5 nm.

It will be appreciated that the x-z retardation coefficient of each layer between the absorbing polarizer layer and the LC layer may contribute to the overall birefringence experienced by light propagating within the display. For example, in the display illustrated in FIG. 1, layers 109, 114 and 104 may each contribute to the retardation of light passing between the LC layer in the LCD cell 102 and the absorbing polarizer layer 109. Adhesive layers, such as layer 104 are, however, usually isotropic. Thus, a total x-z retardation coefficient, $b_{xz\ total}$, may be calculated for a polarizer that is formed from a number of layers, simply by summing up the retardation coefficient of each layer. Thus, the total x-z retardation coefficient, $b_{xz\ total}$ may be calculated as:

$$b_{xz\ total}=\Sigma b_{xz\ i}=\Sigma(n_{xi}-n_{zi})\mathrm{l}_i=\Sigma\Delta n_{xz\ i}\mathrm{l}_i \qquad (2)$$

where the subscript i refers to the ith layer of the absorbing polarizer. Thus, where an absorbing polarizer includes two TAC layers, each having an x-z retardation coefficient of 64 nm, then the total x-z retardation coefficient for the absorbing polarizer is at least 128 nm.

The use of thinner birefringent layers and materials having lower x-z birefringence allows the reduction of the total x-z retardation coefficient. For example, referring back to the display illustrated in FIG. 3, the total x-z retardation coefficient for light propagating between the absorbing polarizer layer 308 and the LC layer in the LCD cell 302 is equal to the x-z retardation coefficient of the polarizer 308, which is 6 nm for the particular example of the 20 µm thick KE polarizer. The adhesive layer 306 and the glass layer in the LCD cell 302 are both isotropic and do not, therefore, contribute to the total x-z retardation coefficient.

Thus, the approaches of making the birefringent layers thinner and reducing the x-z birefringence may be used either separately or in combination to reduce the total x-z retardation coefficient, $b_{xz\ total}$, for the absorbing polarizer to a value less than that of the typical H-type polarizer. For example, the total x-z retardation coefficient, $b_{xz\ total}$, may be less than 20 nm, may preferably be less than 10 nm or may more preferably be less than 5 nm.

Figure 5A:
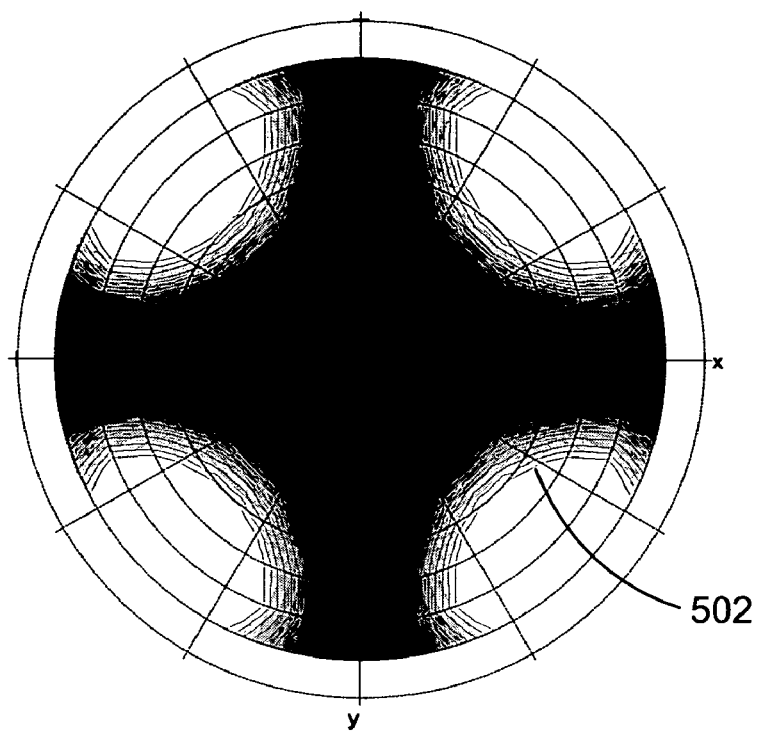
FIG. 5A presents the calculated transmission for light at various angles through an IPS LCD that uses intrinsic polarizers according to principles of the present invention.
Figure 5B:
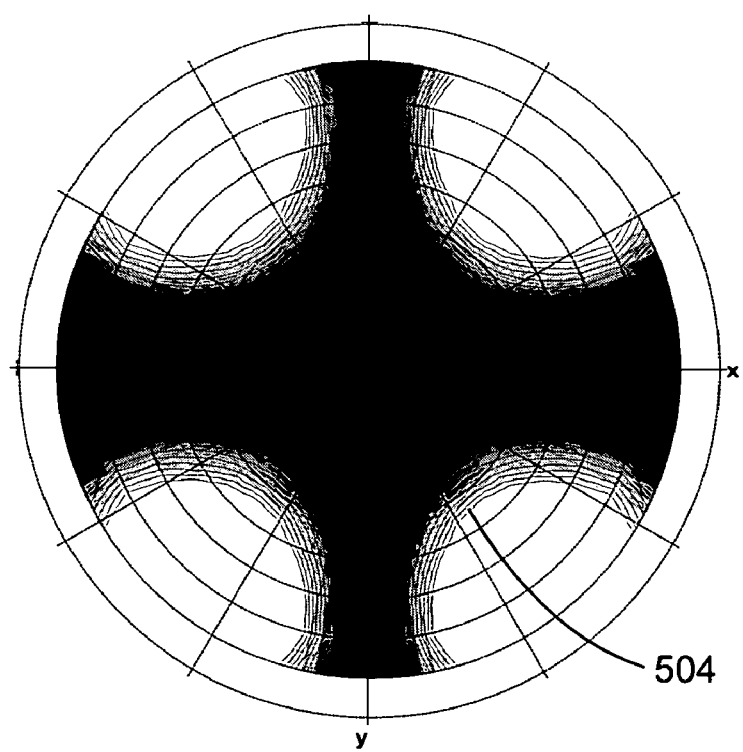
FIG. 5B presents the calculated transmission for light at various angles through an EPS LCD that uses polarizers with TAC layers.

The effect of polarizer birefringence can be more clearly seen with reference to the conoscopic plots shown in FIGS. 5A and 5B, which show data calculated for an in-plane switched (IPS) LCD. These plots show the calculated dark state transmittance through an IPS LCD cell with crossed with KE polarizers, for light incident on the polarizer/LCD cell at various angles. The illuminating light was assumed to be at 550 nm. In FIG. 5A, it was assumed that there was no TAC layer on either side of the LCD cell. The 1% contour 502, i.e. the contour representing those angles at which 99% of the light that might be transmitted is transmitted, has a minimum angle value of about 60°.

In FIG. 5B, it was assumed that there was a TAC layer on either side of the IPS LCD cell, each TAC layer introducing a retardation of 40 nm. For light further and further off-axis, the birefringence mixes the polarization states of the light, with the result that the 1% contour 504 has a minimum angle value of about 54°. In other words, light is transmitted through the LCD cell modeled in FIG. 5B for directions closer to normal transmission than in the model that had no TAC layer. This translates to a reduction in the useful viewing angle of an IPS LCD display if a TAC layer is included. This behavior is qualitatively similar in other types of SIP LCDs.

The use of birefringent layers, such as TAC layers, with a polarizer in a SIP LCD cell also reduces the neutrality of the color of the dark state. An experiment was performed using an IPS LCD taken from a Hitachi Model No. 181SXW LCD monitor that, as manufactured, had H-type polarizers on either side, having TAC layers, as described with respect to FIG. 1. The polarizers on one half of the screen were replaced by 20 µm thick KE-type polarizers. The original side of the screen, having the birefringent TAC layers, is referred to as unmodified and the other side of the screen, having the KE polarizer, is referred to as the modified side. Thus, the construction on the modified side of the screen was similar to that illustrated in FIG. 3.

After modification, the display was driven to display different colors, and the color of the emitted light was measured for representative points for each side of the screen. The color measurements were made when viewed at 60° from normal over a 360° azimuth. Color measurements were made using an Eldim EZContrast 160 conoscope to measure the chromaticity co-ordinates (CIE, 1931) of red, blue, green and dark states of the screen as a function of azimuthal angle.

Figure 6:
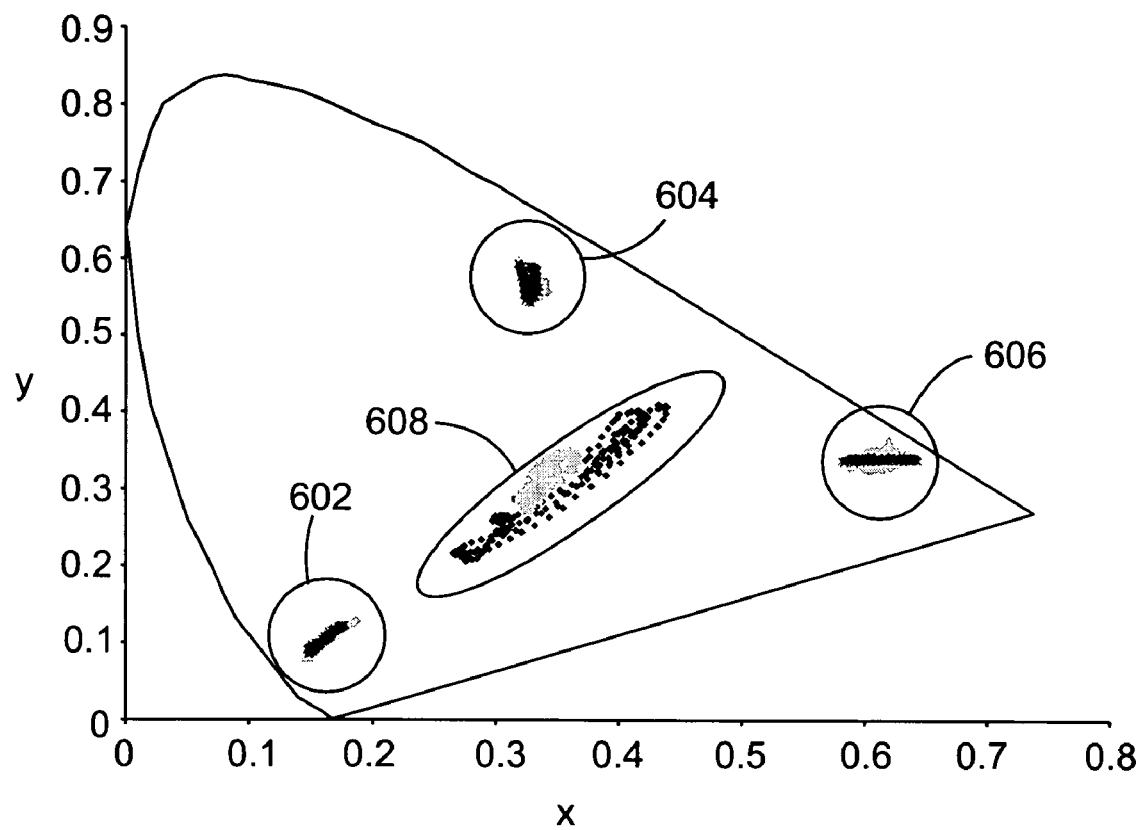
FIG. 6 presents experimental results of color spread for an IPS LCD having polarizers, both with or without TAC layers, for various colors.

The experimental results are presented in FIG. 6. The points measured for the unmodified screen are shown as gray points and the points measured for the modified screen are shown as black points. The first circle 602 illustrates the points measured for the modified and unmodified screens operating with blue light. There is substantial overlap between the gray and black points, indicating that the blue color of the modified screen is similar to the blue color of the unmodified screen. Likewise, the second circle 604 illustrates points measured for the screen operating with green light. Again, there is substantial overlap between the gray points (unmodified screen) and black points (modified screen), showing that the green color of the modified screen is substantially the same as the green color of the unmodified screen. The third circle 606 illustrates the points measured for the screen operating with red light. Again, there is substantial overlap between the gray points (unmodified screen) and black points (modified screen), showing that the red color of the modified screen is substantially the same as the red color of the unmodified screen. The overlap of the gray and black points makes it difficult to distinguish the black and gray points in the for circles 602, 604 and 606.

The color of the screen operating in a dark (black) state is different for the modified and unmodified screens, however. The black points within the ellipse 608 represent the measurements of light emitted from the unmodified screen when operating in the dark state. As can be seen, there is a considerable spread in the color of the dark state points, due to a color shift resulting from the birefringence of the TAC layers in the polarizers of the unmodified polarizers. The dark state extends into the blue and red areas of the chromaticity diagram, and so the dark state manifests considerable color shift when viewed at different angles.

The collection of results corresponding to the modified screen, shown in gray points, shows significantly less spread on the color chart. This means that the dark state of the IPS LCD cell, operating without birefringent TAC layers, shows little angular-dependent color shift when operating in the dark state. The dark state, when operated with layers that result in a lower total x-z retardation coefficient, is, therefore, more neutral in color than when operated with birefringent TAC layers.

Intrinsic polarizers, such as K-type polarizers, used in an LCD stack may also provide an effective gas and moisture permeability barrier to the liquid crystal material in the liquid crystal display cell. Thus, no additional barrier layers or cladding may be needed in an LCD structure constructed with a K-type polarizer disposed on either side of the LCD cell to achieve desired permeability specifications. In particular, a standard for moisture vapor transmission rate (MVTR), ASTM F1249, is less than 20 gm/m²/day, and the oxygen transmission rate (O2GTR), ASTM D3985, is less than 1 ml/m²/day. Structures for liquid crystal displays formed using KE polarizers, including PET support structures, have been shown to have a MVTR of 4.6 m/m²/day, or less, and an O2GTR of less than 0.005 ml/m²/day (tested at 20° C. and 90% relative humidity).

A SIP LCD may include K-type or KE-type polarizers in a number of different constructions, some of which are described further in commonly owned U.S. Pat. No. 6,630, 970 B2, incorporated herein by reference. These different constructions may include hard coatings, diffusers, diffusive adhesive layers, anti-reflection coatings, quarter-wave retarder layers, and the like.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A liquid crystal display, comprising:
   a switched-in-plane (SIP) liquid crystal display (LCD) cell; and
   a first absorbing polarizer, comprising one or more layers including at least an absorbing polarizing layer, disposed on a first side of the LCD cell, the first absorbing polarizer and the LCD cell each lying parallel to an x-y plane defined by orthogonal x- and y-axes, a z-axis being orthogonal to both the x-axis and the y-axis, the first absorbing polarizer defining a transmission polarization direction for light transmitted through the first absorbing polarizer, the transmission polarization direction being parallel to the x-axis, wherein an x-z retardation coefficient, $b_{xz\ total}$, is defined for the first absorbing polarizer as $$b_{xz\ total} = \Sigma(n_{xi} - n_{zi})1_{is}$$

where $n_{xi}$ is the refractive index for light polarized parallel to the x-axis in the ith layer of the first absorbing polarizer, $n_{zi}$ is the refractive index for light polarized parallel to the z-axis in the ith layer of the first absorbing polarizer and $1_i$ is the thickness of the ith layer of the first absorbing polarizer in the z-direction, where i is an integer identifying different layers of the first absorbing polarizer, and $b_{xz\ total} = \Sigma(n_{xi} - n_{zi})1_i$ is less than 20 nm.

2. A display as recited in claim 1, wherein $b_{xz\ total}$ is less than 10 nm.

3. A display as recited in claim 1, wherein $b_{xz\ total}$ is less than 5 nm.

4. A display as recited in claim 1, wherein the SIP LCD cell is an in-plane switched (IPS) cell.

5. A display as recited in claim 1, wherein an absolute value of the difference between $n_x$ of the first absorbing polarizing layer and $n_z$ of the first absorbing polarizing layer is less than 0.0005.

6. A display as recited in claim 5, wherein the intrinsic absorbing polarizer layer is a K-type polarizer layer.

7. A display as recited in claim 5, wherein the intrinsic absorbing polarizer layer is a KE-type polarizer layer.

8. A display as recited in claim 1, wherein the absorbing polarizer layer comprises an intrinsic absorbing polarizer layer.

9. A display as recited in claim 1, wherein the first absorbing polarizer further comprises one or more vapor barrier layers to prevent water vapor from reaching the absorbing polarizing layer.

10. A display as recited in claim 1, wherein the first absorbing polarizer is disposed on a viewing side of the LCD cell.

11. A display as recited in claim 1, further comprising a second absorbing polarizer disposed on a second side of the LCD cell opposite the first side.

12. A display as recited in claim 1, further comprising a light source disposed on an illumination side of the LCD cell.

13. A display as recited in claim 12, further comprising a light guide disposed to direct the light from the light source towards the LCD cell.

14. A display as recited in claim 12, further comprising a transflector disposed between the LCD cell and the light source.

15. A display as recited in claim 12, further comprising at least one light management layer disposed between the LCD cell and the light source.

16. A display as recited in claim 1, further comprising a controller coupled to the LCD cell to control an image imposed by the LCD cell on light passing through the LCD cell.

17. A display as recited in claim 1, wherein the first absorbing polarizer provides a moisture vapor transmission rate of less than about 4.6 gm/m²/day and an oxygen transmission rate of less than about 0.005 ml/m²/day to the LCD cell.

18. A display as recited in claim 1, wherein the value of the x-z retardation co-efficient for all layers between the absorbing polarizer layer and the LCD cell is less than 20 nm.

19. A liquid crystal display, comprising:
    a switched-in-plane (SIP) liquid crystal display (LCD) cell; and
    a first absorbing polarizer, having an absorbing polarizing layer, disposed on a first side of the LCD cell, the first absorbing polarizer and the LCD cell each lying parallel to an x-y plane defined by orthogonal x- and y-axes, a z-axis being orthogonal to both the x-axis and the y-axis, the first absorbing polarizer defining a transmission polarization direction for light transmitted through the first absorbing polarizer, the transmission polarization direction being parallel to the x-axis, where $n_x$ is the refractive index for light polarized parallel to the x-axis in the absorbing polarizing layer and $n_z$ is the refractive index for light polarized parallel to the z-axis in the absorbing polarizing layer, an absolute value of $\Delta n_{xz} = n_x - n_z$ being less than 0.0005.

20. A display as recited in claim 19, wherein the absorbing polarizing layer has a thickness in the z-direction of 1, an absolute value of $b = \Delta n_{xz}$ times 1 being less than 20 nm.

21. A display as recited in claim 20, wherein an absolute value of b is less than 10 nm.

22. A display as recited in claim 20, wherein an absolute value of b is less than 5 nm.

* * * * *

UNITED STATES PATENT AND TRADEMARK OFFICE
CERTIFICATE OF CORRECTION

PATENT NO. : 7,057,682 B2
APPLICATION NO. : 10/746962
DATED : June 6, 2006
INVENTOR(S) : Philip E. Watson et al.

It is certified that error appears in the above-identified patent and that said Letters Patent is hereby corrected as shown below:

On the Title page, in Col. 1, under item 56 (U.S. Patent Documents)
Line 5, below "2003/0210370 A1 11/2003 Yano et al." insert
-- 2002/0010527 A1 1/2002 Wielebski et al. 700/230 --.

Col. 2
Line 19, delete "tat" and insert -- that --, therefor.
Line 41, delete "An z-axis" and insert -- A z-axis --, therefor.

Col. 3
Line 18, delete "description-of" and insert -- description of --, therefor.
Line 34, delete "EPS" and insert -- IPS --, therefor.

Col. 7
Line 54, delete "$\mathbf{n_x} \neq n_x, n_y.$" and insert -- $\mathbf{n_z} \neq n_x, n_y.$ --, therefor.

Col. 8
Line 2, delete "$n_x - \mathbf{n_x} = 0.0008$" and insert -- $n_x - \mathbf{n_z} = 0.0008$ --, therefor.

Col. 10
Line 2, delete "The-first" and insert -- The first --, therefor.
Line 20, delete "the for circles" and insert -- the circles --, therefor.
Line 53, delete "a MVTR of 4.6 m/m$^2$/day," and insert -- an
    MVTR of 4.6 gm/m$^2$/day, --, therefor.

UNITED STATES PATENT AND TRADEMARK OFFICE
CERTIFICATE OF CORRECTION

PATENT NO. : 7,057,682 B2
APPLICATION NO. : 10/746962
DATED : June 6, 2006
INVENTOR(S) : Philip E. Watson et al.

It is certified that error appears in the above-identified patent and that said Letters Patent is hereby corrected as shown below:

Col. 11
Line 22, in Claim 1, delete "$b_{xz\,total}=\Sigma(n_{xi} - n_{zi})\mathbf{l_{is}}$" and insert
-- $b_{xz\,total}=\Sigma(n_{xi} - n_{zi})\mathbf{l_i,}$ --, therefor.

Signed and Sealed this

Sixth Day of May, 2008

JON W. DUDAS
*Director of the United States Patent and Trademark Office*